United States Patent [19]

Freeman

[11] 4,273,152
[45] Jun. 16, 1981

[54] CONTROL VALVE ASSEMBLY WITH ONSTREAM SEAL REMOVAL FEATURE

[76] Inventor: Murray E. Freeman, 1710 Hollow Hook, Houston, Tex. 77080

[21] Appl. No.: 10,717

[22] Filed: Feb. 9, 1979

[51] Int. Cl.³ .......................... F16K 43/00; F16K 5/06
[52] U.S. Cl. .................................. 137/315; 137/559; 137/584; 251/317
[58] Field of Search ................. 137/315, 329.01, 559, 137/584; 251/315, 316, 317

[56] References Cited

U.S. PATENT DOCUMENTS

| | | | |
|---|---|---|---|
| 1,801,361 | 4/1931 | Moore | 137/584 |
| 2,762,601 | 9/1956 | Clade | 251/317 |
| 2,997,057 | 8/1961 | Toth | 137/315 |
| 3,384,341 | 5/1968 | Ripert | 251/317 |
| 3,474,818 | 10/1969 | Hartman | 137/315 |
| 3,567,178 | 3/1971 | Nelson | 251/315 |
| 3,700,003 | 10/1972 | Smith | 251/207 |
| 3,771,545 | 11/1973 | Allen | 137/315 |
| 3,893,469 | 7/1975 | Baker | 137/584 |
| 4,140,149 | 2/1979 | Laignel et al. | 137/584 |

Primary Examiner—Martin P. Schwadron
Assistant Examiner—G. L. Walton
Attorney, Agent, or Firm—Pravel, Gambrell, Hewitt, Kirk, Kimball & Dodge

[57] ABSTRACT

A control valve assembly for controlling fluid flow in a flowline with an onstream seal removal feature, the control valve assembly including a housing to be mounted with the flowline, flow control members mounted with the housing, seal members for preventing unwanted fluid migration between the housing and the flow control members, and access members mounted with the housing for providing access to the seal members while maintaining fluid flow to the housing.

14 Claims, 11 Drawing Figures

CONTROL VALVE ASSEMBLY WITH ONSTREAM SEAL REMOVAL FEATURE

TECHNICAL FIELD OF THE INVENTION

The field of this invention relates to control valves, particularly of the type having internal seal components that are removable while the control valve remains in the flowline.

PRIOR ART

Control valves have long been known in the prior art for controlling fluid flow in flowlines. However, sealing components within those control valves are subject to wear and consequent leakage. In the past, it has been necessary that flow to the control valve be completely shut off prior to the repair of such a control valve for replacement of seals and the like. In order to remove flow to such a control valve, upstream blocking valves and appropriate bypass networks were necessary in order to accomplish blockage of flow to the control valve itself. This, of course, resulted in additional valving components which, they in and of themselves, were subject to wear. Extra expense resulted from having at least two additional valves in each flowline for every control valve; that is, an upstream blocking valve capable of directing flow to a bypass network around the control valve and a downstream valve capable of regulating such flow from the bypass network into the original flowline while maintenance is being accomplished on the main control valve's sealing components. Thus, for every control valve susceptible to maintenance, at least two additional valves and a bypass piping network about the control valve itself were necessitated.

Many prior art patents, such as U.S. Pat. Nos. 719,528; 1,841,050; 2,769,456; 2,880,748; 2,997,057; 3,330,296; and, 3,700,003, disclose typical types of valve sealing arrangements. However, insofar as known, no valve is available wherein the sealing elements of the control valve are replaceable while fluid flow is actively maintained in the flowline to the housing of the control valve itself. Furthermore, so far as known, no control valve assembly heretofore known has the capability of having its sealing components replaced while flow continues through the control valve housing.

SUMMARY OF THE INVENTION

It is an object of the present invention to provide a control valve assembly capable of having the internal sealing components thereof removed while flow is actively maintained to the housing of the control valve assembly.

The control valve assembly of the present invention has a housing adapted to be mounted with the flowline and has a flow control member mounted within the housing for controlling fluid flow through the housing. Sealing members for preventing unwanted fluid migration between the housing and the flow control member are mounted with the flow control member for engaging the housing for preventing such fluid migration. The housing includes access components mounted therewith providing access to the sealing members while maintaining flow to the housing.

It should be understood that this description of the invention is not intended to be limiting but is only exemplary of the many patentable features of this invention, which are set forth in the claims.

DESCRIPTION OF THE PREFERRED EMBODIMENT

Referring to the drawings, the letter C designates generally the control valve assembly of the present invention. The control valve assembly C of the present invention includes multiple embodiments which are broadly referred to as control valve assembly C-1 in FIGS. 1–4, control valve assembly C-2 in FIGS. 5–8, control valve assembly C-3 in FIGS. 9 and 10 and control valve assembly C-4 in FIG. 11. The control valve assembly C generally includes a housing H, flow control means F, seal means S and access means A. Control valve assembly C-1 includes housing H-1, flow control means F-1, seal means S-1 and access means A-1. Similarly, control valve assembly C-2 includes housing H-2, flow control means F-2, seal means S-2 and access means A-2. Control valve assembly C-3 includes housing H-3, flow control means F-3, seal means S-3 and access means A-3. The component parts of the control valve assembly C-1 are designated with numbers within the range of 100–199. The component parts for the control valve assembly C-2 are designated with numbers ranging between 200 and 299, and in like fashion, the component parts of control valve assembly C-3 are designated with numbers ranging between 300–399. The component parts of the control valve assembly C-4 are designated with numbers ranging between 400–499. Unless otherwise noted, the components of this invention are preferably made of steel or other high-strength materials capable of taken high stresses, strains, and corrosive effects typical of fluid-pressure systems.

As shown in the figures, the control valve assembly C of the present invention is adapted to be used for controlling fluid flow within a flowline (not shown). The flowline is adapted to be mounted with the housing H in any conventional fashion. Fluid flow in the flowline may be in the direction of arrow 500 thereinto the housing H, to the flow control means F, through housing H and outwardly therefrom in the direction of arrow 502. It should be noted that the control valve assembly C of the present invention is capable of being used with fluid flowing in the flowline in the directions of arrows 500, 502 as well as alternatively, with reverse fluid flow in the opposite directions of arrows 500, 502, if such is desired. Thus, the control valve assembly C is not limited to fluid flow in either direction through the flowline, but for the purposes of explanation, it will be assumed and preferred that fluid is flowing in the direction of arrow 500 thereinto the control valve assembly C and therefrom in the direction of arrow 502.

Figure 1:
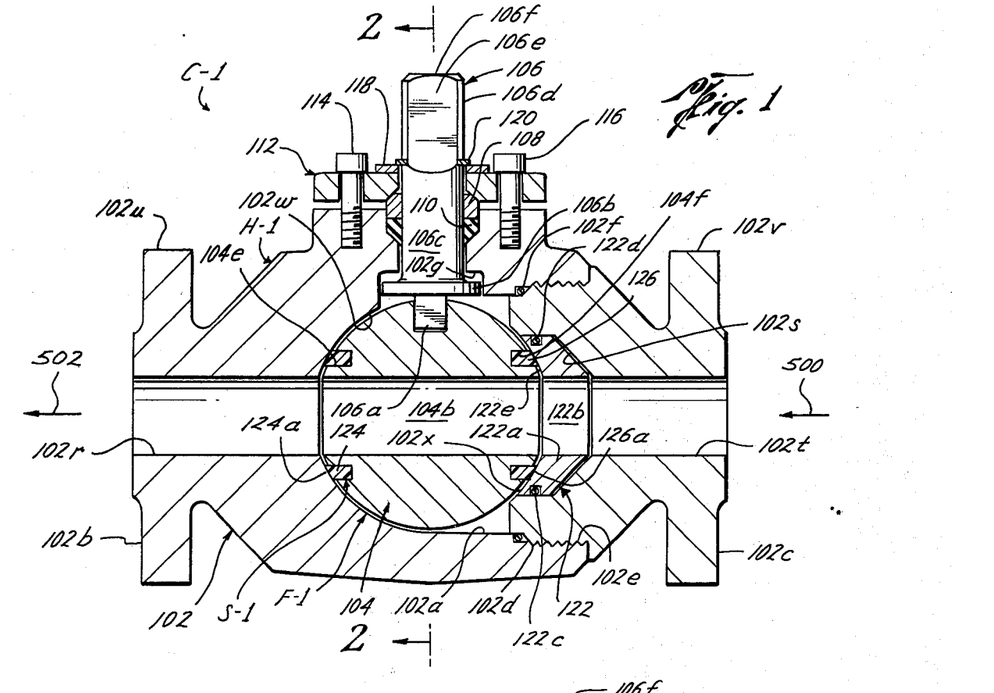
FIG. 1 is a sectional side view of one embodiment of the control valve assembly of the present invention, illustrating usage of a ball valve for the flow control means of the present invention.

As shown in FIGS. 1–4, the control valve assembly C includes control valve assembly C-1 of the present invention. The control valve assembly C-1 includes a housing H-1 such as housing 102 adapted to be mounted with the flowline. The housing 102 is formed having a flow control cavity 102a formed in the major body portion 102b of housing 102. An end flange 102c is removably mounted with the major body portion 102b by means of threads 102d of end flange 102c engaging threads 102e of the major body portion 102b (FIG. 1). An appropriate seal 102f is disposed between the end flange 102c and the major body portion 102b to prevent any fluid leakage therebetween. An actuator cavity 102g is formed adjacent to flow control cavity 102a. The housing 102 further includes housing parts 102h, 102i (FIG. 2) adjacent the flow control cavity 102a. Threaded portions 102j, 102k are formed adjacent to housing ports 102h, 102i, respectively. Threaded portions 102j, 102k are adapted to receive compatible threads 102l, 102m, respectively, formed in housing caps 102n, 102o. Suitable seals 102p, 102q are disposed respectively between the housing caps 102n, 102o and the adjacent portions of the major body portion 102b of the housing 102. The housing 102 further includes passageway 102r formed in the major body portion 102b thereof which is in communication with the flow control cavity 102a. Flanges 102u, 102v are formed with the housing 102 for connecting the housing H-1 with the flowline in any suitable manner.

Figure 2:
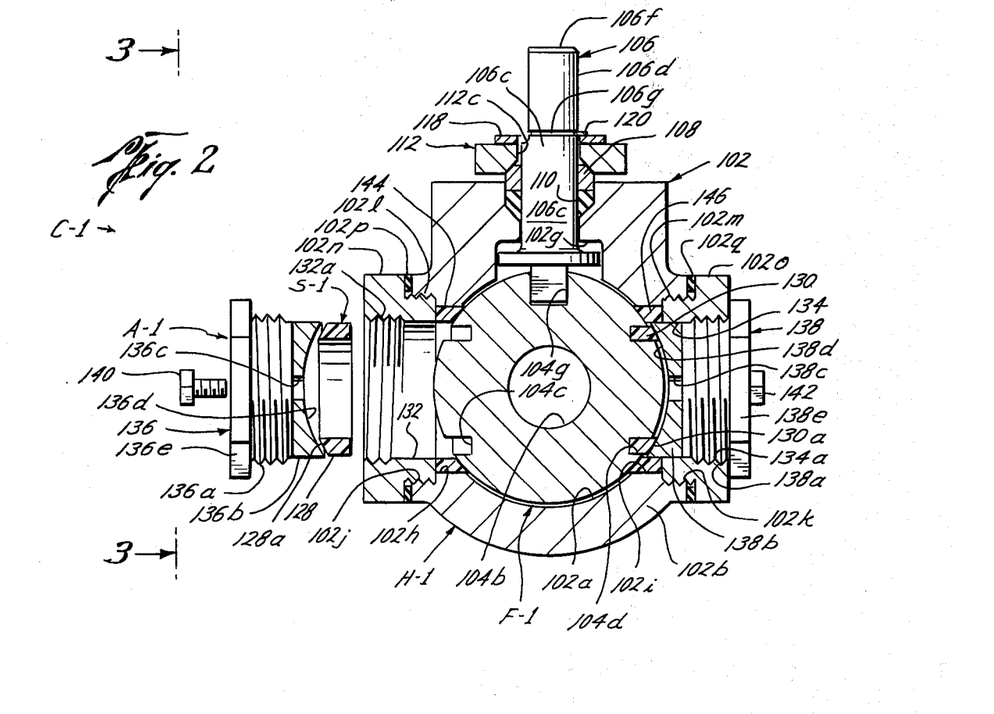
FIG. 2 is a sectional end view of the control valve assembly taken along the lines 2—2 of FIG. 1, illustrating in part the access means of the present invention.
Figure 3:
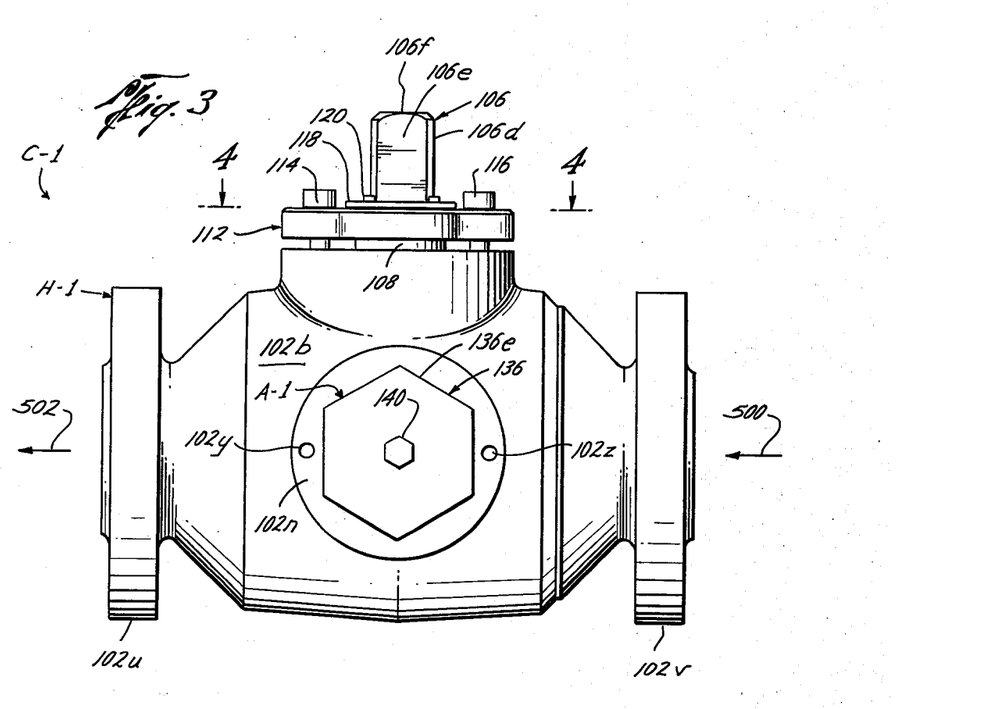
FIG. 3 is a side view of the control valve assembly of FIG. 1, taken along the lines 3—3 of FIG. 2.

The flow control means F-1 is mounted in the flow control cavity 102a of the control valve assembly C-1 of the present invention for controlling fluid flow through the housing H-1. As best seen in FIG. 1, the flow control means F-1 includes ball valve 104 having a generally spherical exterior surface 104a that conforms in part to the configuration of the flow control cavity 102a of the housing 102. The ball valve 104 includes a flow passage 104b formed therein for receiving fluid flow therethrough when in fluid communication with the flowline. The ball valve 104 includes seal receptacle means 104c, 104d, 104e, 104f for receiving seal means S-1 as discussed more fully hereinbelow. Preferably, seal receptacle means 104e, 104f are formed about the flow passage 104b, and are of a generally annular configuration (FIG. 1). Seal receptacle means 104c, 104d are also of an annular configuration, however, formed substantially at 90° to the flow passage 104b as best seen in FIG. 2. The ball valve 104 of the flow control means F-1 further includes an actuator detent 104g formed in the upper portion thereof.

The flow control means F-1 further includes a ball valve actuator 106. The ball valve actuator 106 includes an actuator projection 106a adapted to be received in the actuator detent 104g of the ball valve 104. The actuator projection 106a is formed adjacent to guide 106b which is adapted to be received in the actuator cavity 102g formed within the housing 102. The guide 106b is formed on actuator shaft 106c which extends through the major body portion 102b of the housing 102, and extends therefrom. Preferably, suitable engaging means 106d, such as flats 106e are formed adjacent end 106f of the ball valve actuator 106. Suitable packing 108, 110 between the ball valve actuator shaft 106c and the housing 102 prevent any fluid leakage therebetween.

Figure 4:
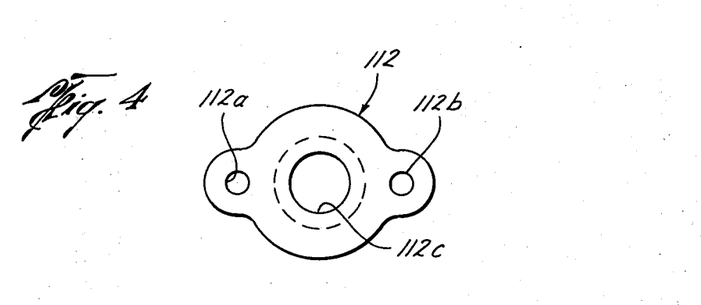
FIG. 4 is a plan view of the ball valve packing cover taken along the lines 4—4 of FIG. 3.

The packing 108, 110 is secured in place by ball valve packing cover 112 which is best seen in FIG. 4. The packing cover 112 includes bolt openings 112a, 112b and actuator shaft opening 112c formed therein. As shown in FIG. 1, bolts 114, 116 are adapted to be received in bolt openings 112a, 112b, respectively, of the packing cover 112 for securing the packing cover 112 to the housing 102. Bolts 114, 116 are appropriately threaded into the housing 102. The actuator shaft 106c extends through the actuator shaft opening 112c in the packing cover with a suitable sleeve 118 disposed about the actuator shaft 106c and adapted to ride upon the upper surface of the packing cover 112, with the sleeve 118 adapted to be located and positioned by means of clip 120, of the spring type or the like, which is received in clip groove 106g formed in the actuator shaft 106c of the ball valve actuator 106.

It should be noted that removal of the clip 120, sleeve 118, packing cover 112 allows removal of the ball valve actuator 106 from the housing 102 after the ball valve 104 is removed from the flow control cavity 102a. With the ball valve 104 so removed, the ball valve actuator 106 may be lowered into the flow control cavity 102a and outwardly therefrom when necessary. Thus, the flow control means F-1 of the present invention including the ball valve 104 may be removed from the flow control cavity 102a upon removal of end flange 102c by releasing the threaded engagement between threads 102d, 102e of the housing 102. Orientation of the ball valve 104 of necessity would be such that the engaging means 106a of the ball valve actuator 106 and the actuator detent 104g be aligned with the passageway 102r for removal of the ball valve 104 from the flow control cavity 102a.

The end flange 102c of the housing 102 is formed with a seal cavity 102s formed adjacent the passageway 102t formed in the end flange 102c. The seal cavity 102s is adapted to receive ball valve seal means designated generally 122 therein. The ball valve seal means 122 includes a ball valve seal 122a having a passageway 122b formed therein. The ball valve seal 122a further includes a detent 122c suitable for receiving an appropriate seal 122d such as an O-ring or the like. The ball valve seal 122a may be of steel or any suitable material and is adapted to be disposed within the seal cavity 102s of the end flange 102c which form a portion of the flow control cavity 102a. The ball valve seal 122a also includes a sealing surface 122e for engaging the seal means S-1 as discussed more fully hereinbelow (FIG. 1).

The control valve assembly C-1 of the present invention further includes seal means S-1 for preventing the unwanted migration of fluid flow between the housing H-1 and the flow control means F-1. The seal means S-1 includes flow passage seals 124, 126 mounted with the ball valve 104 adjacent flow passage 104b for engaging the flow control cavity 102a of the housing 102 and ball valve seal 122a to prevent unwanted fluid flow between the flow control cavity 102a and the flow control means F-1, when appropriately positioned as discussed more fully hereinbelow. Flow passage seals 124, 126 are preferably mounted in seal receptacle means 104e, 104f, respectively, adjacent flow passage 104b. Blocking seals 128, 130 are mounted with the ball valve 104 in seal receptacle means 104c, 104d, respectively (FIG. 2). Flow passage seals 124, 126 and blocking seals 128, 130 include external sealing surfaces 124a, 126a, 128a and 130a, respectively.

The flow control means F-1 is mounted for movement in the flow control cavity 102a between a first position (FIG. 1) wherein fluid flows through the flow passage 104b and a second position (not shown) wherein fluid does not flow through the flow passage 104b. For example and not by way of limitation, rotation of the ball valve 104 by the ball valve actuator 106 to a position approximately 90° to that shown in FIG. 1 would result in a second position wherein fluid would not flow through the flow passage 104b. The flow passage seals 124, 126 mounted with the ball valve 104 adjacent the flow passage 104b engage the flow control cavity 102a of the housing 102 to prevent unwanted fluid flow between the flow control cavity 102a and the ball valve 104 when in the first position, shown in FIG. 1. The blocking seals 128, 130 are mounted with the ball valve 104 for sealably blocking fluid flow about the ball valve 104 when the ball valve 104 is in the second position. It will be appreciated that in the second position, fluid flow will be present in passageway 102t inasmuch as fluid flow is in the direction of arrow 500 into housing H-1, with fluid flow also being present in passageway 122b (FIG. 1). However, in the second position, the flow passage 104b is not in communication therewith, resulting in the fluid pressure acting upon the flow control means F-1. The engagement of the blocking seals 128, 130 with the flow control cavity prevents fluid flow about and between the flow control means F-1 as disposed within the flow control cavity 102a when in the second position.

The control valve assembly C-1 of the present invention further includes access means A-1 mounted with the housing H-1 for providing access to the seal means S-1 while maintaining fluid flow to the housing H-1. The access means A-1 provides access to the flow passage seals 124, 126 when the flow control means F-1 is in the second position and access to the blocking seals 128, 130 when the flow control means F-1 is in the first position. The access means A-1 includes access ports 132, 134 formed in the housing caps 102n, 102o of the housing 102, with such access ports 132, 134 being in communication with flow control cavity 102a. The access ports 132, 134 have threaded portions 132a, 134a formed adjacent the outer surface thereof. The access means A-1 further includes cover means designated generally as 136, 138 and adapted to be received in access ports 132, 134, respectively. More particularly, cover means 136 includes threads 136a formed therewith which are adapted to engage threaded portions 132a of access port 132 whereas cover means 138 includes threads 138a which are adapted to be received by and engage threaded portions 134a of access port 134. Cover means 136, 138 may include adapter means 136b, 138b formed with cover means 136, 138. The adapter means 136b, 138b may alternatively be formed separately of the cover means 136, 138. Preferably, suitable openings 136c, 138c are formed with the adapter means 136b, 138b as described more fully hereinbelow. The adapter means 136b, 138b are adapted to be disposed in the access ports 132, 134 to provide an adapter sealing surface 136d, 138d for coacting with the external sealing surfaces 124a, 126a, 128a, 130a of the seal means S-1. Preferably, the adapter sealing surfaces 136d, 138d conform substantially to the exterior surface of the ball valve 104 that is positioned adjacent the access ports 132, 134. The cover means 136, 138 are formed having openings (not shown) therein for receiving pressure release means 140, 142 that are mountable with the cover means 136, 138, respectively, for venting any trapped fluid pressure between the cover means 136, 138 and the flow control means F-1 within the flow control cavity 102a of the housing 102. The pressure release means 140, 142 may be a bolt sealably threaded into such openings formed in the cover means 136, 138 or any other suitable type of structure for accomplishing the same result. Preferably, the cover means 136, 138 is formed having engaging surfaces 136e, 138e to be engaged by a suitable tool (not shown) for rotating the cover means 136, 138 for removal and/or installation thereof. As shown, the engaging surfaces 136e, 138e are of a hexagonal configuration; however, any other suitable configuration may be used.

As best seen in FIG. 2, redundant seal means designated generally 144, 146, are adapted to be disposed between the housing caps 102n, 102o and the flow control means F-1 within the housing ports 102h, 102i, respectively, for preventing fluid migration therebetween the flow control means F-1 and the flow control cavity 102a during removal of the seal means S-1. The redundant seal means 144, 146 of FIG. 2 are preferably secured in position by the housing caps 102n, 102o such that the redundant seal means engage the ball valve 104 in a sealing relation.

In the use and operation of the control valve assembly C-1 of the present invention, assembly and disassembly of the flow control means F-1 is accomplished by removing the end flange 102c from the major body portion 102b of the housing by unthreading same. It will be appreciated that flange 102y has appropriate bolt holes (not shown) formed therein allowing a suitable tool to be inserted therein permitting rotation of the end flange 102c with respect to the major body portion 102b of the housing for removal thereof. The end flange 102c, when in position, has interior surface portions 102w, 102x which conform substantially to the exterior surface 104a of the ball valve 104. In addition, the ball valve seal means 122 is disposed within the end flange 102c and further is adapted to be engaged by the ball valve 104 and seal means S-1. As shown in FIG. 1, the control valve assembly C-1 is in a first position wherein fluid flows through passageway 102t, passageway 122b, flow passage 104b, passageway 102r, and outwardly therefrom housing 102 in the direction of arrow 502. Sealable fluid flow therethrough such passageways is insured by the flow passage seals 124, 126 engaging the flow control cavity 102a, and ball valve seal means 122, respectively. While in this position, the blocking seals 128, 130 may be removed from the ball valve 104 after removal of the pressure release means 140, 142, cover means 136, 138 including adapter means 136b, 138b. The adapter seal surface 136d, 138d is preferably designed to conform substantially to the configuration of the flow control cavity 102a within the housing 102 such that the seal means S-1 may sealably engage the adapter seal surface 136d, 138d in sealable relation. However, upon removal of the blocking seal 128 as shown in FIG. 2, the redundant seals 144, 146 further insure the integrity and lack of fluid pressure adjacent to the removed blocking seal 128 in addition to the sealing action of the flow passage seals 124, 126. Preferably, suitable openings 102y, 102z are formed in the housing caps 102n, 102o for receiving an appropriate tool (not shown) such as a spanner wrench, for loosening and removal of the housing caps 102n, 102o, when desired. It will be appreciated that the control valve assembly C-1 has a safety feature in that the means of removal of the housing cap is different than that of the cover means 136, 138 to prevent the inadvertent removal of the housing caps 102n, 102o instead of the cover means 136, 138 during seal inspection operations.

Upon inspection, removal or replacement of the blocking seals 128, 130, as shown in FIG. 2, the cover means 136, 138 are appropriately repositioned within the housing caps 102n, 102o. Without restraining fluid flow to the housing H-1, the flow control means F-1, by actuation of the ball valve actuator 106, may be rotated from its first position to a second position wherein the flow passage 104b is not in fluid flow with the flowline. For example, the ball valve 104 may be rotated to a position substantially 90° to that shown in FIG. 1 to a second position. In the second position, the blocking seals 128, 130 are adjacent the passageways 102r, 102t, respectively, (or vice versa depending upon the direction of rotation of the ball valve 104) which results in preventing fluid flow through the housing H-1 with the blocking seals 128, 130 sealably engaging the flow control cavity 102a and the ball valve seal means 122. Suitable indexing (not shown) may be incorporated to indicate proper positioning between the seal means S-1 and passageways 102r, 102t. As such, the flow passage seals 124, 126 may be inspected, repaired and/or replaced upon removal of the cover means 136, 138 and its associated adapter means 136b, 138b. Thereafter, the flow passage seals 124, 126 may be reinserted into the seal receptacle means 104e, 104f formed in the ball valve 104, with the adapter means 136b, 138b and cover means 136, 138 thereafter repositioned with the housing 102. Thereafter, the ball valve 104 may be repositioned into the first position wherein fluid flow through flow passage 104b is reestablished.

Thus, removal of the seal means S-1 of the present invention is effectuated without blocking fluid flow from the flowline to the housing H-1 during such seal removal procedure. Furthermore, in order to remove the seal means S-1 of the flow control means F-1, the flow control means F-1 need not be removed from the housing H-1 nor need the housing H-1 be removed from the flowline itself. The flow control means F-1 need only be rotated to a position such that the access means A-1 provides access to the seal means S-1 positioned with the flow control means F-1. Because of the ease of construction and access to the seal means S-1 by the access means A-1 of the present invention, the flow passage seals 124, 126 may be quickly and efficiently replaced by use of the access means A-1 while not necessitating alternative shut down of the flowline.

The control valve assembly C of the present invention further includes control valve assembly C-2 having housing H-2, flow control means F-2, seal means S-2 and access means A-2. The control valve assembly C-2 is shown in FIGS. 5-8.

Figure 5:
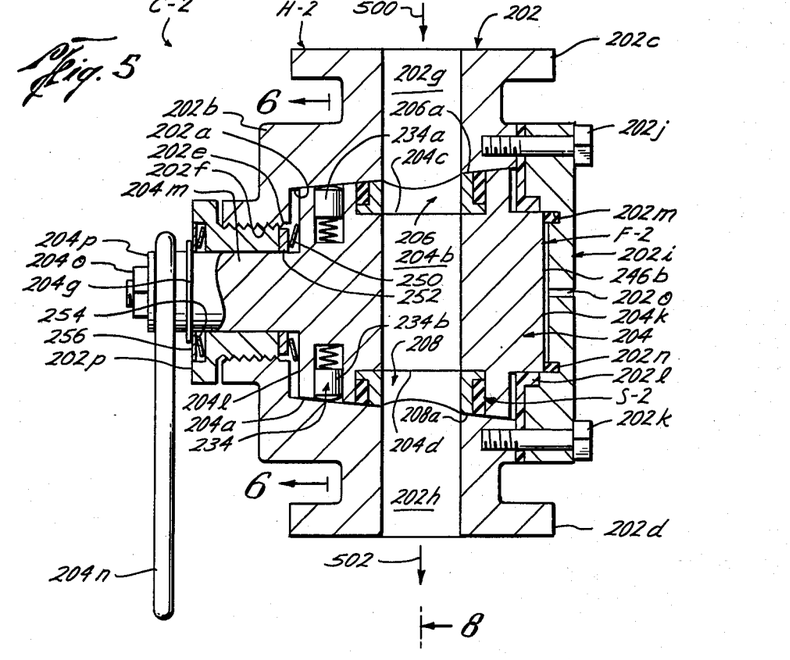
FIG. 5 is a sectional side view of a second embodiment of the control valve assembly of the present invention, illustrating usage of a plug valve for the flow control means of the present invention.

As shown in FIG. 5, the housing H-2 includes housing 202. Housing 202 includes a flow control cavity 202a formed therein with the flow control cavity 202a being in flow communication with the flowline. The flow control cavity 202a is formed in body portion 202b of the housing 202. The body portion 202b includes flanges 202c, 202d formed therewith, with the flanges 202c, 202d adapted to be suitably connected with the flowline (not shown) having fluid flowing in the direction of arrows 500, 502. The housing 202 further includes an actuator cavity 202e formed in the body portion 202b adjacent the flow control cavity 202a and preferably formed having threads 202f formed therewith. The housing 202 has passageways 202g, 202h formed therein and in flow communication with flow control cavity 202a.

The housing 202 includes an end flange designated generally 202i removably mounted with the housing 202 to permit access to the flow conrol means F-2. The end flange 202i is mounted with the body portion 202b by means of suitable bolts 202j, 202k which are threaded into the body portion 202b of the housing 202. An appropriate end flange gasket 202l is disposed between the end flange 202i and the body portion 202b to prevent fluid leakage therebetween. The end flange 202i is formed with seal detent 202m therein. A plug end seal 202n is adapted to be disposed in the seal detent 202m for sealable contact with the flow control means F-2. An opening 202o is preferably formed in the central portion of the end flange 202i as discussed more fully hereinbelow.

The control valve assembly C-2 of the present invention further includes flow control means F-2. The flow control means F-2 includes plug valve designated generally as 204. The plug valve 204 is adpated to be mounted in the flow control cavity 202a of the housing 202 for controlling fluid flow through the housing H-2. The plug valve 204 includes an exterior surface 204a which is preferably of a taper, truncated conical configuration. However, any other suitable type of configuration plug valve 204 may be used, such as a cylindrical plug valve by way of example.

The plug valve 204 is formed having a flow passage 204b formed therein for receiving fluid flow therethrough when in fluid communication with the flowline. Seal receptacle means 204c, 204d, 204e, 204f are formed with the plug valve 204, with seal receptacle means 204c, 204d formed adjacent flow passage 204b and seal receptacle means 204e, 204f preferably formed substantially 90° thereto. Pawl detents 204g, 204h, 204i, 204j (FIG. 6) are preferably formed with the plug valve 204 of the flow control means F-2 of the present invention as discussed more fully hereinbelow. The plug valve 204 is further formed having flange end surface 204k and inner surface 204l. Inner surface 204l is formed adjacent actuator shaft 204m which is adapted to be disposed within actuator cavity 202e of the housing 202. The actuator shaft 204m extends through and is connected with the actuator cavity 202e by gland nut 202p which threadedly engages threads 202f of the actuator cavity 202e. An appropriate handle 204n is adapted to be attached to the actuator shaft 204m by an appropriate nut 204o and washer 204p, assembly. A locating ring 204q is apropriately mounted with the actuator shaft 204m adjacent handle 204n as discussed more fully hereinbelow. The flow control means F-2 is mounted for movement in the flow control cavity 202a of housing 202 between a first position wherein fluid flows through the flow passage 204b of plug valve 204 (FIGS. 5, 8) and a second position wherein fluid does not flow through said flow passage (not shown), with such second position being substantially a 90° rotation of the plug valve 204 with respect to the positions of FIGS. 5, 8.

The seal means S-2 of the control valve assembly C-2 of the present invention is for preventing unwanted migration of fluid flow between the housing H-2 and the flow control means F-2. The seal means S-2 includes flow passage seals 206, 208 and blocking seals 210, 212. Seals 206, 208, 210, 212 each respectively have external sealing surfaces 206a, 208a, 210a, 212a which conform substantially to the configuration of the flow control cavity 202a of housing 202 adjacent the passageways 202g, 202h. Preferably, flow passage seal 206 is disposed within seal receptacle means 204c while flow passage seal 208 is disposed within seal receptacle means 204d. In similar fashion, blocking seal 210 is disposed within seal receptacle means 204e and blocking seal 212 is disposed within seal receptacle means 204f. The seal means S-2 may be of any suitable type or material and as shown in FIG. 5, may include a seal of multiple component materials, based upon the particular requirements of the environment that the control valve assembly C-2 of the present invention is desired to work under.

Figure 8:
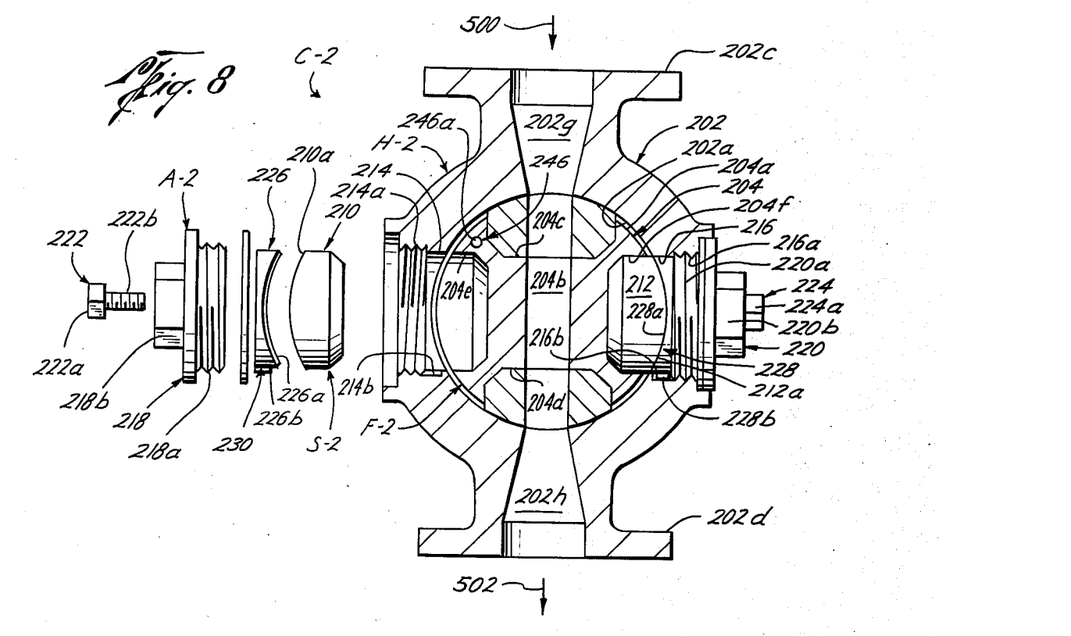
FIG. 8 is a sectional end view of the control valve assembly of the present invention as taken along the lines 8—8 of FIG. 5.

The control valve assembly C-2 further includes access means A-2 mounted with the housing H-2 for providing access to the seal means S-2 while maintaining fluid flow to the housing H-2. The access means A-2 includes access ports 214, 216 formed with housing 202 and in communication with the flow control cavity 202a and cover means 218, 220 removably mounted with the access ports 214, 216, respectively, for covering the access ports 214, 216 and for removal therefrom during inspection of the seal means S-2. The access ports (FIG. 8) are formed with the housing 202 having threaded portions 214a, 216a adjacent thereto for receiving cover means 218, 220. The cover means 218, 220 include threaded portions 218a, 220a adapted to be received in threads 214a, 216a of the access ports 214, 216. Engaging means 218b, 220b are preferably formed with cover means 218, 220 and adapted to be engaged by an appropriate tool (not shown). As shown in FIG. 8, the engaging means 218b, 220b include flats to be engaged by a suitable wrench (not shown) to allow rotation of the cover means 218, 220 upon removal from and attached with the housing H-2. Openings (not shown) are preferably formed within the central portion of the cover means 218, 220 and adapted to receive pressure release means 222, 224, respectively. The pressure release means 222, 224 may include bolts 222a, 224a that are adapted to be threadedly mounted with the cover means 218, 220, respectively. Furthermore, the pressure release means 222 includes longitudinal slot 222b formed in bolt 222a. Pressure release means 24 may be similarly configured. The longitudinal slot 222b allows partial removal of the pressure release means 222, 224 from the cover means 218, 220 during the venting of any trapped fluid pressure between the cover means 218, 220 and the flow control means F-2 within the flow control cavity 202a in the housing H-2 without high-pressure discharge thereof.

The control valve assembly C-2 further includes adapter means designated generally 226, 228 disposed in the access ports 214, 216, respectively, to provide adapter sealing surfaces 226a, 228a for coacting with the external sealing surfaces 206a, 208a, 210a, 212a of the seal means S-2 of the present invention. Preferably, the adapter sealing surfaces 226a, 228a conform substantially to the exterior surface 204a of the plug valve 204 adjacent the access ports 214, 216 respectively.

Positioning means designated generally 230, 232 are formed with the adapter means 226, 228 and access ports 214, 216, respectively, to prevent rotational movement of the adapter means 226, 228 within the access ports 214, 216 upon installation of the cover means 218, 220 to insure proper positioning of the adapter means 226, 228 therein. The positioning means 230, 232 include keys 226b, 228b formed with the adapter means 226, 228 and similarly sized detents 214b, 216b formed in access ports 214, 216 such that detents 214b, 216b receive keys 226b, 228b to prevent rotational movement of the adapter means 226, 228 upon installation of the cover means 218, 220. It will be appreciated that the positioning means 230, 232 may be of any other suitable configuration capable of preventing rotational movement of the adapter means 226, 228 within the access ports 214, 216. Further, with the plug valve 204 being of a non-spherical configuration, it is necessary that the adapter means 226, 228 be located with respect to the plug valve 204 such that no binding will occur adjacent the seals.

The control valve assembly C-2 may further include, if desired, indexing means designated generally as 234 (FIGS. 5, 6) with the housing H-2 and flow control means F-2 for indexing to indicate when the flow control means F-2 is in the first or second position as described above. The indexing means 234 includes pawl detents 204g, 204h, 204i, 204j formed with plug valve 204 of the flow control means F-2 of the present invention. The indexing means 234 further includes indexing pawls 234a, 234b, 234c, 234d adapted to be mounted in the pawl detects 204g, 204h, 204i, 204j, respectively, having springs 234e, 234f, 234g, 234h disposed therebetween, respectively. The springs 234e, 234f, 234g, 234h act upon the indexing pawls 234a, 234b, 234c, 234d, respectively, to urge the same outwardly therefrom the flow control means F-2 of the present invention. Indexing detents 202q, 202r are preferably formed with the housing H-2 for receiving the indexing pawls as desired when the flow control means F-2 is in the first or second position.

Indexing release means designated generally as 236, 238 are mounted with the housing H-2. The indexing release means 236, 238 allows the indexing pawls to move into engagement with the indexing detents upon removal of the indexing release means 236, 238, when the flow control means F-2 is in the first or second position as desired. The indexing release means 236, 238 may include bolts 236a, 238a adapted to be threadedly received in threaded openings 202s, 202t formed in the housing 202 adjacent indexing detents 202q, 202r, respectively. Threaded engagement of indexing release means 238 (FIG. 6) results in the forcing of the indexing pawl 234d inwardly against action of the spring 234h, resulting in the indexing pawl 234d not being able to move into the indexing detent 202r formed in the housing 202. However, upon removal of indexing release means such as removal of bolts 236a (FIG. 6), the indexing pawl 234c moves into the indexing detent 202q of housing 202 by the spring 234g resiliently acting upon the indexing pawl 234c to force the same into engagement with the indexing detent 202q; thus, the indexing pawls prevent relative movement of the flow control means F-2 with respect to the housing H-2 until the indexing release means is inserted to engage and release the indexing pawl from the indexing detent.

Figure 6:
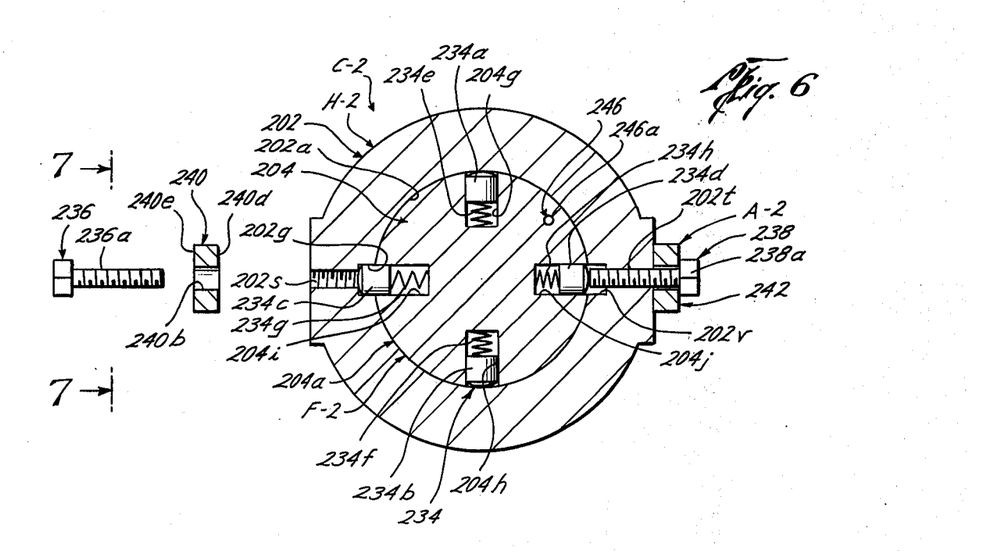
FIG. 6 is a front sectional view of the indexing means of the control valve assembly as taken along the lines of 6—6 of FIG. 5.
Figure 7:
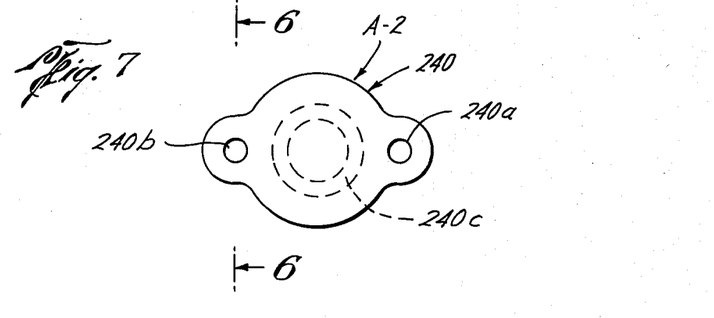
FIG. 7 is a front view of one form of the cover means of the control valve assembly of the present invention as taken along the lines of 7—7 of FIG. 6.

As shown in FIG. 6, the indexing means 234 permits relative movement of the flow control means F-2 in discrete 90° increments. It is preferred that such positions of the indexing pawls be such that they correspond directly with the location of the seal means S-2 with the flow control means F-2, thus positively indentifying the location of the seal means S-2 either being adjacent the access means A-2 or adjacent the passageways 202g, 202h formed in the housing 202 of the housing H-2 of the present invention.

When utilizing the indexing means 234 with the control valve assembly C-2 of the present invention, an alternative to cover means 218, 220 may be used such as cover means 240, 242. Cover means 240 (FIG. 7) is of a substantially plate-type configuration having openings 240a, 240b formed therein. An appropriate detent 240c is further formed on the inner surface 240d thereof to allow mounting of a suitable seal (not shown) therewith for sealable engagement with the access port 214. The exterior surface 240e of the cover means 240 is adapted to be engaged by bolts 236a, 238a of the indexing release means 236, 238 for securing the cover means 240, 242 to the housing H-2. As shown in FIG. 6, bolts 236a is adapted to be disposed in opening 240b of cover means 240 with the bolt 236a engaging indexing pawl 234c. An additional bolt (not shown) necessarily must be inserted through opening 240a of the cover means 240 for securing the cover means 240 with the housing 202. An adapter means (not shown) similar to adapter means 226, 228 is positioned in engagement with the inner surface 240d, 242d of the cover means 240, 242 for proper positioning of the adapter means 226, 228 in access ports 214, 216, respectively. Thus, the cover means 240, 242 may act in similar fashion as cover means 218, 220, but incorporating therewith indexing means 234.

The cover means of 218, 220 may alternatively be utilized in conjunction with indexing means 234 if the indexing releasing means 236, 238 are mounted with the housing 202 alone. For example, the bolt 236 need not be attached to cover means 240 but alternatively could merely be threaded into the housing 202 for depressing indexing pawl 234c without functioning in its capacity to also maintain and secure a cover means, such as 240.

The flow control means F-2 further includes pressure equalizing means 246 with the plug valve 204 and housing 202 for venting unwanted pressure buildups within the housing 202 to atmosphere. The pressure equalizing means 246 includes opening 246a formed in the plug valve 204 extending between the flange end surface 204k and inner surface 204l of the plug valve 204. Fluid pressure, if any, trapped between the inner surface 204l and the housing 202 when the flow control means F-2 is in position may be directed through the passageway 246a to pressure equalizing chamber 246b formed between the flange end surface 204k of the plug valve 204 and end flange 202i. Pressure buildup within the pressure equalizing chamber 246b is vented to atmosphere through opening 202o formed in end flange 202i. Thus, any trapped pressure, be it fluid pressure or otherwise, may be safely vented to atmosphere.

It will be appreciated that when mounting the flow control means F-2 with the housing H-2 of the control valve assembly C-2 of the present invention that the actuator shaft 204m of the plug valve 204 is disposed within the gland nut 202p. Suitable spring washer 250 is mounted between the inner surface 204l of the plug valve 204 and washer 252 adjacent gland nut 202p. Similarly, spring washer 254 is mounted between the gland nut 202p and washer 256 which engages locator ring 204q mounted with the actuator shaft 204m of plug valve 204. The spring washers 250, 254 in effect load the plug valve 204 in such a fashion that it is drawn into the flow control cavity 202a of the housing 202 insuring that a positive seal is maintained therebetween. Further, the loading upon the plug valve 204 tends to force the tapered exterior surface 204a of the plug valve 204 into engagement with the flow control cavity 202a of the housing 202. End flange gasket 202l and plug end seal 202n further insure the maintenance of fluid integrity within the control valve assembly C-2 of the present invention.

Thus, the control valve assembly C-2 of the present invention may be used in similar fashion to that of the control valve assembly C-1 in that the seal means S-2 may be replaced, inspected and/or repaired without removing the housing H-2 from the flowline. When the flow control means F-2 is in the first position (FIGS. 5, 8), the blocking seals 210, 212 may be removed from the access ports 214, 216 for inspection thereof while fluid flow flows into the housing H-2 in the direction of arrow 500 and outwardly therefrom in the direction of arrow 502. Upon replacement of the blocking seals 210, 212 and reassembly of the access means A-2 with the housing H-2, the flow control means F-2 may be rotated to the second position (not shown) substantially 90° to that of the first position. In the second position, the blocking seals 210, 212 prevent fluid flow through the housing H-2 and through the flow control means F-2. However, in this position, the flow passage seals 206, 208 may be appropriately inspected after removal of the access means A-2 from the housing H-2. After inspection, the flow passage seals 206, 208 may be replaced, inspected and/or repaired, and thereafter repositioned in the flow control means F-2. The adapter means 226, 228 and cover means 218, 220 of the access means A-2 are thereafter replaced with the housing H-2. Thereafter, the flow control means F-2 may be moved back to the first position wherein flow may again be re-established through the flow passage 204b of the plug valve 204, yet not requiring shutting down fluid flow to the housing H-2 to effectuate such maintenance.

Figure 9:
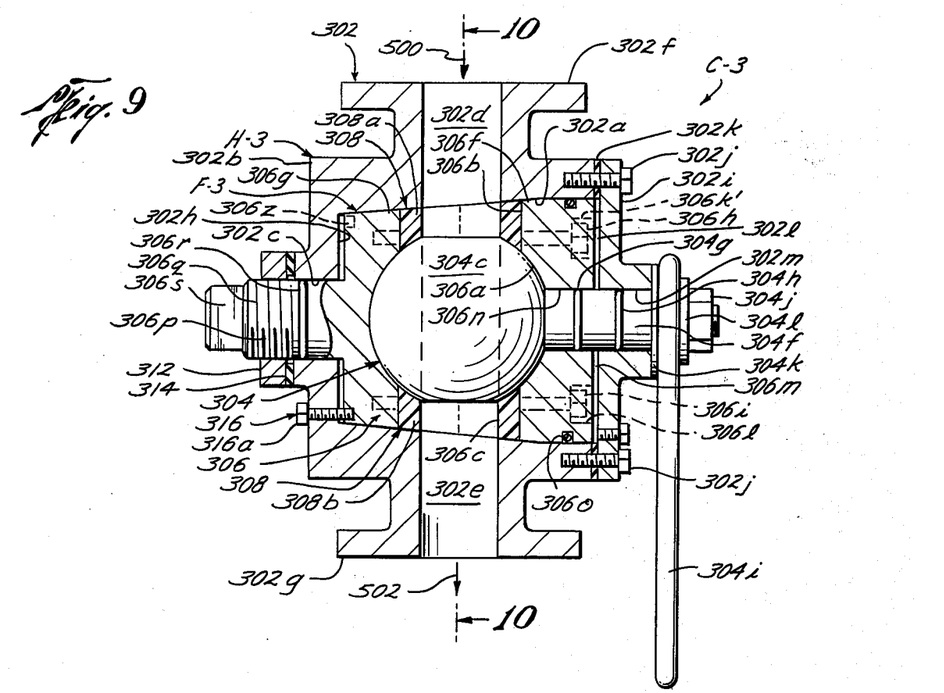
FIG. 9 is a sectional side view of a third embodiment of the control valve assembly of the present invention, illustrating use of a first movable element and second movable element for the flow control means of the present invention.
Figure 10:
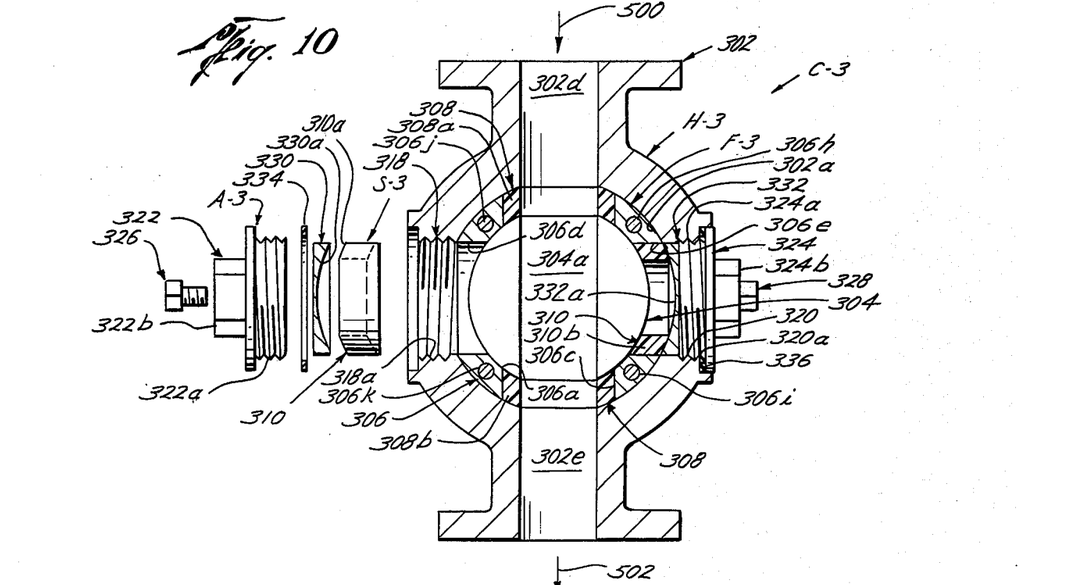
FIG. 10 is a sectional end view of the control valve assembly taken along the lines of 10—10 of FIG. 9, and showing the access means of the present invention; and, FIG. 11 is a sectional, side view of the control valve assembly of the present invention, showing an alternate indexing means and an alternate housing-handle assembly.

The control valve assembly C of the present invention further includes control valve assembly C-3 which includes housing H-3, flow control means F-3, seal means S-3 and access means A-3.

The control valve assembly C-3 includes housing H-3 such as housing 302 (FIGS. 9, 10) having flow control cavity 302a formed therein. The housing 302 is adapted to be mounted with the flowline such that the flow control cavity 302a is in communication therewith. The housing 302 includes body portion 302b, and actuator cavity 302c, passageways 302d, 302e which are in flow communication with the flowline, flanges 302f, 302g for connecting the housing 302 with the flowline, inner surface 302h and end flange 302i. The end flange 302i is adapted to be mounted with the body portion 302b of the housing 302 by means of suitable bolts 302j, having gasket 302k disposed between the end flange 302i and body portion 302b for preventing fluid leakage therebetween. End flange 302i further includes inner surfaces 302l and cavity 302m formed therein.

The flow control means F-3 of the control valve assembly C-3 is mounted in the flow control cavity 302a of the housing 302 for controlling fluid flow through the housing H-3. The flow control means F-3 includes a first movable element 304 and a second movable element 306. The first movable element has a flow passage 304a formed therein for receiving fluid flow therethrough when in fluid communication with the flowline. The first movable element 304 is mounted for movement between a first position wherein fluid flows through the flow passage 304a (FIGS. 9, 10) and a second position wherein fluid does not flow through the flow passage 304a (not shown).

It is preferred that the first movable element 304 be a ball valve as shown in FIGS. 9, 10; however, any other suitable valving element will suffice as is desired. The first movable element preferably includes a ball valve 304c having exterior surface 304e and adapted to be disposed within the second movable element 306 as described more fully hereinbelow. The ball valve 304c further includes an actuator shaft 304f having suitable seals 304g, 304h mounted therewith. Handle 304i is affixed to the actuator shaft 304f by a suitable nut 304j and washers 304k, 304l assembly, with the nut 304j being threadedly affixed to a suitably formed portion on actuator shaft 304f for securing the handle 304i thereto.

The flow control means F-3 of the present invention further includes a second movable element 306 mounted within the flow control cavity 302a of the housing 302. The second movable element 306 has an element chamber 306a formed therein for receiving the ball valve 304c of the first movable element 304. It is preferred that the element chamber 306a substantially conform to the exterior surface 304e of the ball valve 304c of the first movable element 304.

As shown in FIGS. 9, 10, it is preferred that the second movable element 306 be formed of a generally truncated, conic configuration, much as a plug valve, however, any other suitable configuration element may be used as desired. The second movable element 306 is adapted to have the seal means S-3 mounted therewith. The second movable element 306 includes primary ports 306b, 306c and secondary ports 306d, 306e. The primary ports 306b, 306c are adapted to communicate with the flowline and the flow passage 304a of the first movable element 304 when the first movable element 304 is in the first position and the second movable element 306 is in an initial position. The secondary ports 306d, 306e are adapted to communicate with the flowline and the flow passage 304a of the first movable element 304 when the first movable element 304 is in the first position and the second movable element 306 is in a secondary position. As shown in FIGS. 9, 10, the second movable element 306 is in the initial position wherein fluid flow in the direction of arrow 500 enters into passageway 302d thereinto primary port 306b, through flow passage 304a, therefrom primary port 306c, thereinto passageway 302e and outwardly therefrom in the direction of arrow 502.

The seal means S-3 is adapted to be disposed within the primary ports 306b, 306c and secondary ports 306d, 306e. The seal means S-3 includes primary seals 308 and secondary seals 310. The primary seals 308 include seals 308a, 308b removably mounted with the primary ports 306b, 306c of the second movable element 306 for preventing fluid migration between the housing 302, the primary ports 306b, 306c and the flow passage 304a of the first movable element 304 when the first movable element 304 is in the first position and the second movable element 306 is in the primary position. The seal means S-3 further includes secondary seals 310 including seals 310a, 310b removably mounted with the secondary ports 306d, 306e for preventing fluid migration between the housing 302, secondary ports 306d, 306e and flow passage 304a formed in the first movable element 304 when the first movable element 304 is in the first position and the second movable element 306 is in the secondary position. Suitable openings are formed within primary seals 308 and secondary seals 310 correspond substantially to those in passageways 302d, flow passage 304a and passageway 302e. The secondary position (not shown) is defined by rotation of the second movable element 306 substantially 90° to that shown in FIG. 10 such that the secondary ports 306d, 306e and secondary seals 310a, 310b are positioned in flow communication with passageways 302d, flow passage 304a and passageway 302e.

It will be appreciated that when the primary seals 308 and secondary seals 310 are properly positioned within the control valve assembly C-3 of the present invention, the seal means S-3 will sealably engage the flow control cavity 302a of housing 302 as well as the exterior surface 304e of ball valve 304c of the first movable element 304. It is preferred that the second movable element 306 be formed at body portions 306f, 306g, which constitute essentially two separable portions which are joined together preferably by threaded fasteners 306h, 306i, 306j, 306k extending from and through body portion 306f (FIG. 9) thereinto body portion 306g for threaded engagement therewith for securing body portion 306f, 306g theretogether. Suitable detents such as detents 306k', 306l (FIG. 9) are formed with the body portion 306f for receiving the threaded fasteners such as 306h, 306i with the heads of the same not extending beyond the end surface 306m of body portion 306f. Suitable actuator shaft cavity 306n is formed in body portion 306f and adapted to receive actuator shaft 304f of the first movable element 304 therein. An appropriate seal such as O-ring 306o is mountable with the exterior surface of the body portion 306f and adapted to engage the flow control cavity 302a of housing 302 to prevent fluid migration therebetween.

The body porton 306g of second movable element 306 includes an actuating shaft 306p formed therewith. The actuating shaft 306p has threads 306q formed therewith adjacent to seal 306r mounted on the actuating shaft 306p. The seal 306r is adapted to engage the actuator cavity 302c formed in housing 302 to prevent fluid migration therebetween such surfaces. Appropriate engaging means 306s such as wrench flats or the like are further formed with the actuating shaft 306p for engagement by a suitable tool (not shown) which allows rotation of the actuating shaft 306p with respect to the housing 302 of the housing H-3 of the present invention.

The second movable element 306 is secured with the housing 302 by suitable fastener 312 and its associated washer 314 such that the fastener 312 threadedly engages threads 306q formed on actuating shaft 306p of the second movable element 306. Tightening of the fastener 312 results in drawing the second movable element further into the tapered flow control cavity 302a of the housing 302 further insuring a sealable relation between the second movable element 306 and the housing 302. During installation of the second movable element 306 within the housing 302, any pressure buildup between the end surface 306t of body portion 306g of second movable element 306 may be vented by the pressure reliever means designated generally as 316 which may include threaded bolt 316a which communicates with the chamber formed therebetween end surface 306t of the second movable element 306 and inner surface 302h of housing 302. Removal of the pressure reliever means 316 prevents any compression of fluid entrapped therebetween such surfaces and allows the second movable element 306 to properly seat within the flow control cavity 302a of housing 302. Further, bolt 316a is adapted to be received in detent 306z formed in the second movable element 306 to prevent unwanted rotation of the second movable element 306 when properly positioned therein. Preferably, four (4) detents, such as 306f, are formed with the second movable element 306 at 90° positions.

The control valve assembly C-3 of the present invention further includes access means A-3 which includes access ports 318, 320 and cover means 322, 324. The access means A-3 permits inspection of the secondary seals 310 while the first movable element 304 is in the first position and the second movable element 306 is in its initial position as shown in FIG. 10. The access ports 318, 320 are formed with the housing 302 and preferably include threaded portions 318a, 320a, respectively. The cover means 322, 324 include threaded portions 322a, 324a and engaging means 322b, 324b, respectively. The threaded portions 322a, 324a of cover means 322, 324 are adapted to be received in threaded portions 318a, 320a of access ports 318, 320, respectively.

Preferably, pressure release means 326, 328 are mountable with cover means 322, 324 for venting any trapped fluid pressure between the cover means 322, 324 and the flow control means F-3 within the flow control cavity 302a of the housing 302 of the housing H-3 of the present invention. The pressure release means 326, 328 may be threaded bolts having longitudinal slots such as the pressure release means 222, 224 of the control valve assembly C-2 of the present invention as discussed hereinabove or any suitable replacement therefor. The cover means 322, 324 are thus removably mounted with the access ports 318, 320, respectively, for covering the access ports 318, 320 and for removal therefrom during inspection of the seal means S-3 of the present invention.

The control valve assembly C-3 of the present invention further includes adapter means 330, 332 disposed in the access ports 318, 320 for providing adapter sealing surfaces 330a, 332a for coating with the seal means S-3 of the present invention. It is preferred that the adapter sealing surfaces 330a, 332a conform substantially to the external surface of the flow control means F-3 adjacent the access ports 318, 320, formed in housing 302. As such, the adapter sealing surfaces 330a, 332a preferably conform to the configuration of the flow control cavity 302a. Suitable seals 334, 336 insure fluid integrity therebetween the housing H-3 and cover means 332, 334, respectively, when installed therewith. Suitable positioning means, such as positioning means 230 formed with the control valve assembly C-2 of the present invention may be used also with the control valve assembly C-3 of the present invention as desired and is useful for preventing any unwanted rotation of the adapter means 330, 332 upon reassembly of the cover means 322, 324 with housing H-3 of the control valve assembly C-3 of the present invention.

In the use or operation of the control valve assembly C-3 of the present invention as shown in FIGS. 9 and 10, flow through the flow control means F-3 may be regulated by either the first movable element 304 or second movable element 306. It is preferred that the first movable element 304 be primarily responsible for regulating fluid flow through the housing 302 by appropriate actuation of the handle 304i for actuating the relative exposure of the flow passage 304a formed in ball valve 304c with the flowline for regulating flow therethrough. As such, the first movable element 304 is movable between the first position wherein fluid flow through the flow passage 304a and a second position wherein fluid will now flow through the flow passage 304a. However, irrespective of movement of the first movable element 304, secondary seals 310 may be removed from the flow control means F-3 upon removal of the cover means 322, 324. During this operation, primary seals 308 maintain a sealable relation between the housing 302, second movable element 306 and first movable element 304. As such, the secondary seals 310 may be thus inspected, repaired and/or replaced while regulation of fluid flow through the housing H-3 may be effectuated by appropriate movement of the first movable element 304.

Upon replacement of secondary seals 310, the second movable element 306 may be moved from this initial position wherein the secondary seals 310 are replaceable to a secondary position wherein the primary seals 308 are adjacent the access means A-3 and secondary seals 310 are adjacent passageway 302d, flow passage 304a and passageway 302e and in sealable relation thereto. As a result, the primary seals 308 may be removed, inspected and/or replaced as desired upon removal of the cover means 322, 324. It will be appreciated that rotation of the second movable element 306 is accomplished by releasing and/or loosening fastener 312 and bolt 316 and engaging the engaging surfaces 306s by an appropriate tool (not shown) for appropriate rotation of the second movable element 306 of the flow control means F-3 of the present invention. Thus, by movement of the second movable element 306 into its initial position, the secondary seals 310 may be appropriately inspected whereas upon movement of the second movable element 306 into its secondary position, the primary seals 308 may be removed for inspection purposes. However, but for the brief time necessary for rotation, fluid flow through the housing H-3 of the control valve assembly C-3 of the present invention may be maintained without necessitating shutting down of the flowline, even though the secondary seals 310 may be replaced with the second movable element 306 in its initial position. Alternatively, the primary seals may be replaced when the second movable element 306 is in its secondary position while fluid flow regulation of that fluid flow may further be maintained by appropriate positioning of the first movable element 304 between its first position wherein fluid flows through the flow passage 304a when in fluid communication with the flowline and a second position where fluid does not flow through the flow passage 304a.

Figure 11:
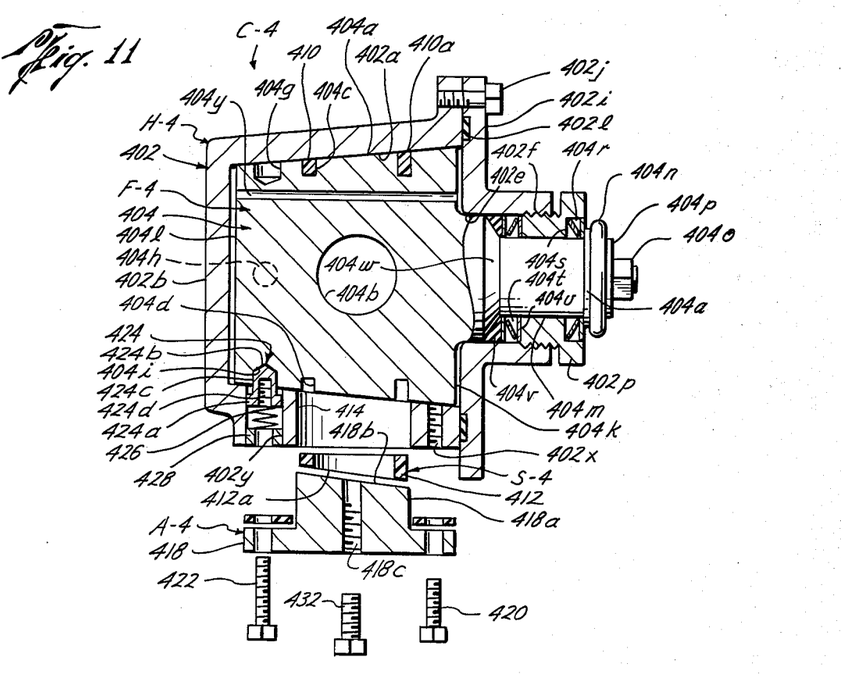

The control valve assembly C of the present invention further includes control valve assembly C-4 having housing H-4, flow control means F-4, seal means S-4 and access means A-4. The control valve assembly C-4 is shown in FIG. 11.

The housing H-4 includes housing 402. The housing 402 includes a flow control cavity 402a formed therein, with the flow control cavity 402a being in flow communication with the flowline. The flow control cavity 402a is formed in body portion 402b of the housing 402. The body portion 402b includes an actuator cavity 402e formed in the body portion 402b adjacent flow control cavity 402a and is preferably formed having threads 402f therewith. Suitable flanges (not shown) as depicted with the control valve assembly C-2 of the present invention are formed with the housing 402 for connecting same with the flowline having fluid flowing in the direction of arrows 500, 502. Passageways similar to passageways 202g, 202h of the control valve assembly C-2 are formed with the control valve assembly C-4 and are in flow communication with flow control cavity 402a.

The housing 402 further includes a bonnet 402i removably mounted with the body portion 402b of housing 402. Preferably, the bonnet 402i is formed with the actuator cavity 402e and has threads 402f formed therein. The bonnet 402i is removably mounted with the housing 402 to permit access to the flow control means F-4. The bonnet 402i is mounted with the body portion 402b by means of suitable bolts such as 402j which are threaded into the body portion 402b of the housing 402. An appropriate bonnet seal 402l is mountable with the bonnet 402i and adapted to be disposed therebetween the bonnet 402i and the body portion 402b of the housing 402 to prevent fluid leakage therebetween.

The control valve assembly C-4 of the present invention further includes flow control means F-4. The flow control means F-4 includes plug valve designated generally as 404. The plug valve 404 is adapted to be mounted in the flow control cavity 402a of the housing 402 for controlling fluid flow through the housing H-4. The plug valve 404 includes an exterior surface 404a which is preferably of a taper, truncated conical configuration. However, any other suitable type of configuration plug valve 404 may be used, such as a cylindrical plug valve by way of example.

The plug valve 404 is formed having a flow passage 404b therein for receiving fluid flow therethrough when in fluid communication with the flowline. Seal receptacle means 404c, 404d are formed with the plug valve 404, with two additional seal receptacle means (not shown) also formed with the plug valve 404, however in axial alignment with the flow passage 404b and formed substantially 90° with respect to the seal receptacle means 404c, 404d. Indexing detents 404g, 404h, 404i (and one not shown) are preferably formed with the plug valve 404 of the flow control means F-4 of the present invention adjacent respective seal receptacle means. Preferably, the central axis of the indexing detents extends through the longitudinal axis of the plug valve 404 and the seal receptacle means, such as 404c, 404d, is in longitudinal alignment therewith along the length of the plug valve 404.

The plug valve is preferably formed having a bonnet end surface 404k and an inner end surface 404l, each of substantially the same surface area. Bonnet end surface 404k is formed adjacent actuator shaft 404m which is adapted to be disposed within actuator cavity 402e of the housing 402. The actuator shaft 404m extends through and is connected with actuator cavity 402e by gland nut 402p which threadedly engages threads 402f of the actuator cavity 402e. An appropriate handle 404n is adapted to be attached to the actuator shaft 404m by a nut 404o and washer 404p assembly. A washer 404q is mounted with the actuator shaft 404m adjacent handle 404n.

A spring designated generally 404r is disposed in a suitable detent 404s formed in gland nut 402p while an additional spring such as spring 404t is adapted to be disposed about the actuator shaft 404m adjacent the end 404u of gland nut 402p however, opposite to the mounting of spring 404r. It is preferred that the springs 404r, 404t be of the Bellville type. Springs 404t are adapted to engage a suitable packing 404v disposed about the actuator shaft 404m, and in sealing engagement with the tapered lip 404w formed therebetween the actuator shaft 404m and the body portion of the plug valve 404. It will be appreciated that the washer-spring assemblies 404r, 404v act to load the plug valve 404 in such a fashion that it is drawn into the flow control cavity 402a of the housing 402 to insure that a positive seal is maintained therebetween. Further, the loading upon the plug valve 404 tends to force the tapered exterior surface 404a of the plug valve 404 into engagement with the flow control cavity 402a of the housing 402. The packing 404v is adapted to engage the lip 404w and the cavity 402e to provide a sealable relation therebetween to prevent unwanted fluid migration.

The seal means S-4 of the control valve assembly C-4 of the present invention is for preventing unwanted migration of fluid between the housing H-4 and flow control means F-4. The seal means S-4 includes flow passage seals (not shown) and blocking seals 410, 412. The flow passage seals are similar to those shown as seals 206, 208 of the control valve assembly C-2. Seals 410, 412, respectively, have external sealing surfaces 410a, 412a which conform substantially to the configuration of the flow control cavity 402a of the housing 402 adjacent the passageways which connect the same to the flowline. Preferably, a blocking seal 410 is disposed in seal receptacle 404c while blocking seal 412 is disposed in seal receptacle 404d. Seals are also disposed within seal receptacles formed in axial alignment with the flow passage 404b adjacent each end thereof. The seal means S-4 may be of any suitable type or material and/or may be of multiple components thereof, all of which are based upon the particular requirements of the environment that the control valve assembly C-4 of the present invention is desired to work under.

The control valve assembly C-4 further includes access means A-4 mounted in the housing H-4 for providing access to the seal means S-4 while maintaining fluid flow to the housing H-4. The access means A-4 includes an access port 414 formed with the housing 402 and in communication with the flow control cavity 402a and cover means 418 removably mounted therewith the access port 414 for covering the access port 414 and removal therefrom during inspection of the seal means S-4. While only one access port 414 and cover means 418 is depicted in FIG. 11, the control valve assembly C-4 of the present invention may also include configurations including two or four access ports and their corresponding cover means. The cover means 418 preferably includes a cylindrical portion 418a adapted to be received in access port 414 with the end surface 418b thereof corresponding to the taper of the cavity 402a of the housing 402 and adapted to engage the sealing surface, such as surfaces 410a, 412a of the seal means 410, 412 of the seal means S-4 of the present invention. The cover means 418 is adapted to be mounted and properly positioned with the housing H-4 by means of cover bolts 420, 422. Cover bolt 420 is adapted to be received in threaded opening 402x formed in the housing 402 of the present invention.

Preferably, an opening 402y is formed in the housing 402 adjacent access port 414. An indexing pawl 424 is adapted to be disposed within the opening 402y with the indexing pawl having an exterior surface 424a in engagement with the opening 402y. The indexing pawl 424 further includes a generally conically shaped end portion 424b and a neck portion 424c adjacent thereto. An interior threaded opening 424d is formed centrally thereof the indexing pawl 424. A spring 426 is adapted to be disposed within the opening 402y and in abutting relation to the indexing pawl 424. The spring 426 is secured within the opening 402y by sleeve 428 which is mounted within opening 402y. Preferably, the sleeve 428 may be press fit within the opening 402y or alternatively, may be threaded or in any other suitable fashion mounted within the opening 402y for securing the spring 426 and indexing pawl 424 within the housing.

The indexing pawl 424 is adapted to be received within the detent such as 404i. The spring 426 resiliently acting against sleeve 428 urges the indexing pawl 424 into the detent 404i. The conically shaped end 424b of the indexing pawl 424 helps align the indexing pawl 424 within the detent 404i. The location of the indexing pawl 424 as it relates to engagement with the detent 404i results in proper orientation of the plug valve 404 with respect to the access port 414 such that the seal means S-4 of the present invention may be properly removed. The bolt 422 is adapted to be inserted within sleeve 428, therethrough spring 426 and into threaded opening 424d of the indexing pawl 424. Upon threaded engagement therebetween the bolt 422 and indexing pawl 424, the indexing pawl 424 is withdrawn from the detent 404i of the plug valve 404 to allow rotation thereof. Withdrawal of the indexing pawl 424 from the detent 404i results in compressing the spring 426 against sleeve 428 thus drawing the bolt tightly into the housing H-4 such that the cover means 418 is securely mounted with the housing H-4. An appropriate gasket 430 insures a sealable relation between the cover means 418 and the housing 402. Thus, the detent 404i, bolt 422, indexing pawl 424, spring 426 and sleeve 428 all coact to comprise the indexing means of the control valve assembly C-4.

A threaded opening 418a is preferably formed within the cover means 418 and is adapted to receive threaded bolt 432 therein. Removal of the threaded bolt 432 allows venting of any unwanted pressure therebetween the plug valve 404 and housing 402 prior to the removal of the cover means 418. It will be appreciated that a portion 418a of the cover means 418 acts as the adapter means of the control valve assembly C-4 for appropriately insuring proper positioning and a suitable relation therebetween the seal means S-4 and the cover means 418. Furthermore, a longitudinal opening 404y formed in the plug valve 404 allows communication between the cavities adjacent end surfaces 404k and 404l such that any unwanted fluid pressure buildups may be appropriately equalized between end surfaces 404k and 404l, inasmuch as such surfaces 404k, 404l are of substantially the same surface area. Extraction of the bolt 432 from opening 418a allows the discharge of any unwanted fluid pressure within housing H-4 prior to removal of the cover means 418. Thus, the longitudinal opening 404y and the bolt 432 act as pressure equalizing means for equalizing unwanted pressure buildups within the housing 402 and with removal of bolt 432 being a means for venting such buildups to atmosphere, as desired. The indexing pawl 424 is adapted to engage the detents such as 404i at discrete 90° intervals to permit exact positioning of the seal means S-4 adjacent to the cover means 418.

Thus, the control valve assembly C-4 of the present invention may be used in similar fashion to that of the control valve assemblies C-1, C-2, C-3 in that the seal means S-4 may be replaced, inspected and/or repaired without removing the housing H-4 from the flowline. When the flow control means S-4 is in the first position (FIG. 11), blocking seals may each be individually removed from the access port 414 for inspection thereof while fluid flows through the housing H-4. Upon replacement of the blocking seals and reassembly of the access means A-4 with the housing H-4, the flow control means F-4 may be rotated to a second position (not shown) substantially 90° to that of the first position. In the second position, the blocking seals prevent fluid flow through the housing H-4 and through the flow control means F-4. However, in this position, the flow passage seals (not shown) may be appropriately individually inspected after removal of the access means A-4 from the housing H-4. With only one access port 414, the flow control means F-4 must be rotated to an opposing 180° position to permit proper inspection of both of such seals, with the cover means 418 of the access means A-4 necessarily requiring assembly, disassembly and reassembly to effectuate inspection of opposed pairs of seals, be they blocking seals or flow passage seals. Thereafter, the flow control means F-4 may be moved back to the first position wherein flow again may be re-established through the flow passage 404b of the plug valve 404, while not requiring shutting down fluid flow to the housing H-4 to effectuate such maintenance.

Thus, the control valve assembly C of the present invention comprehends replacement of the seal means S while the housing H is maintained in onstream, fluid communication with the flowline. The control valve assemblies C-1, C-2 of the present invention permit the inspection of the seal means S-1, S-2 while the housings H-1, H-2 are in communication with the flowline under fluid pressure, however, with fluid flow through the housings H-1, H-2 being shut off but without necessitating removal of the housings H-1, H-2 from the flowline nor necessitating any upstream-downstream blockage and its attendant piping network for changeout of the seal means S-1, S-2. Further, the control valve assembly C-3 in addition to allowing such changeout procedures of the seals means S-3 during actual fluid flow communication with the housing H-3, flow through the housing H-3 and flow control means F-3 is maintainable at the same time that the seal means S-3 is removed for inspection.

As such, the control valve assembly C of the present invention presents a new, novel and expeditious means for allowing access to the seal means S for inspection thereof during normal operation of flow control assemblies C.

The foregoing disclosure and description of the invention are illustrative and explanatory thereof, and various changes in the size, shape and materials as well as in the details of the illustrated construction may be made without departing from the spirit of the invention.

I claim:

1. A control valve assembly with onstream seal removal feature for controlling fluid flow in a flowline, comprising:
   a housing adapted to be mounted with the flowline, said housing having a flow control cavity formed therein, said flow control cavity in flow communication with the flowline;

flow control means mounted in said flow control cavity for controlling fluid flow through said housing wherein said flow control means includes a ball valve for controlling fluid flow through said housing;

seal means for preventing the unwanted migration of fluid flow between said housing and said ball valve, said seal means having an external sealing surface;

said seal means mounted with said ball valve for engaging said flow control cavity of said housing at said external sealing surface to prevent fluid migration therebetween;

access means mounted with said housing for providing access to said seal means while maintaining fluid flow to said housing; and, redundant seal means adapted to engage said housing, said access means and said ball valve said redundant seal means continuously engages said ball valve and for preventing fluid migration therebetween said ball valve and said flow control cavity during removal or inspection of said seal means.

2. The control valve assembly of claim 1, wherein:

said ball valve has a flow passage formed therein for receiving the fluid flow therethrough when in fluid communication with the flowline;

said ball valve is mounted for movement in said flow control cavity between a first position wherein fluid flows through said flow passage and a second position wherein fluid does not flow through said flow passage; and, said seal means includes flow passage seals mounted with said ball valve adjacent said flow passage for engaging said flow control cavity to prevent unwanted fluid flow between said flow control cavity and said ball valve when in said first position.

3. The control valve assembly of claim 2, wherein:

said seal means includes blocking seals mounted with said ball valve for sealably blocking fluid flow about said ball valve when in said second position, the central axis of said blocking seals being substantially perpendicular to the central axis of said flow passage seals.

4. The control valve assembly of claim 1, further including:

seal receptacle means formed in said ball valve for receiving said seal means therein.

5. The control valve assembly of claim 4, wherein:

said external sealing surface of said seal means has a geometrically similar configuration to that of the external surface of said flow control means and the internal surface of said flow control cavity of said housing.

6. The control valve assembly of claim 1, wherein said access means further includes:

an access port formed with said housing and in communication with said flow control cavity; and, cover means removably mounted with said access port for covering said access port and for removal therefrom during inspection of said seal means.

7. The control valve assembly of claim 6, further including:

pressure release means mounted with said cover means for venting any trapped fluid pressure between said cover means and said flow control means within said flow control cavity in said housing.

8. The control valve assembly of claim 6, further including:

adapter means disposed in said access port to provide an adapter sealing surface for coacting with said external sealing surface of said seal means.

9. The control valve assembly of claim 8, wherein:

said adapter sealing surface conforms substantially to the exterior surface of said flow control means adjacent said access port.

10. The control valve assembly of claim 8, wherein:

said adapter means is formed with said cover means.

11. The control valve assembly of claim 6, further including:

a housing port formed in said housing;

a housing cap adapted to be removably mounted with said housing port, said housing cap having said access port formed therein; and, redundant seal means adapted to be disposed between said housing cap and said flow control means in said housing port for preventing fluid migration therebetween said flow control means and said flow control cavity during removal of said seal means.

12. The control valve assembly of claim 1, wherein:

said housing includes an end flange removably mounted with said housing to permit access to said ball valve for inspection thereof.

13. The control valve assembly of claim 12, further including:

ball valve seal means mounted with said end flange for sealing engagement of said ball valve with said end flange.

14. A control valve assembly with onstream seal removal feature for controlling fluid flow in a flowline, comprising:

a housing adapted to be mounted with the flowline, said housing having a flow control cavity formed therein, said flow control cavity in flow communication with the flowline;

flow control means mounted in said flow control cavity for controlling fluid flow through said housing;

seal means for preventing the unwanted migration of fluid flow between said housing and said flow control means, said seal means having an external sealing surface;

said seal means mounted with said flow control means for engaging said flow control cavity of said housing at said external sealing surface to prevent fluid migration therebetween;

access means mounted with said housing for providing access to said seal means while maintaining fluid flow to said housing;

said access means further including an access port formed with said housing and in communication with said flow control cavity;

cover means removably mounted with said access port for covering said access port and for removal therefrom during inspection of said seal means; and, pressure release means mounted with said cover means for venting any trapped fluid pressure between said cover means and said flow control means within said flow control cavity in said housing.

* * * * *